H. O. FINLEY.
BARREL TAP.
APPLICATION FILED JUNE 8, 1918.

1,338,007.

Patented Apr. 27, 1920.

Witness
T. H. Parnell

Inventor
H. O. Finley
By Victor J. Evans
Attorney

UNITED STATES PATENT OFFICE.

HARRY O. FINLEY, OF FORRES, SASKATCHEWAN, CANADA.

BARREL-TAP.

1,338,007.

Specification of Letters Patent.

Patented Apr. 27, 1920.

Application filed June 8, 1918. Serial No. 238,942.

*To all whom it may concern:*

Be it known that I, HARRY O. FINLEY, a citizen of the United States, residing at Forres, in the Province of Saskatchewan and Dominion of Canada, have invented new and useful Improvements in Barrel-Taps, of which the following is a specification.

This invention relates to a barrel tap, and the object is to provide a device which may be connected with the screw threaded nipple of a metallic barrel or tank and through which the oil or other fluid in the tank may be discharged by effecting suitable connection with an air hose for the purpose of producing the required pressure.

A further object is to provide a device of the type specified which shall include a threaded plug having means connected therewith for introducing air under pressure through the plug to the tank, means for discharging fluid from the tank through the plug and means for producing an air-tight connection between the plug and the discharge tube, said tube being slidable with reference to the plug.

With the foregoing and other objects in view the invention consists in the novel construction, combination, and arrangement of elements hereinafter described, and claimed.

Figure 1:
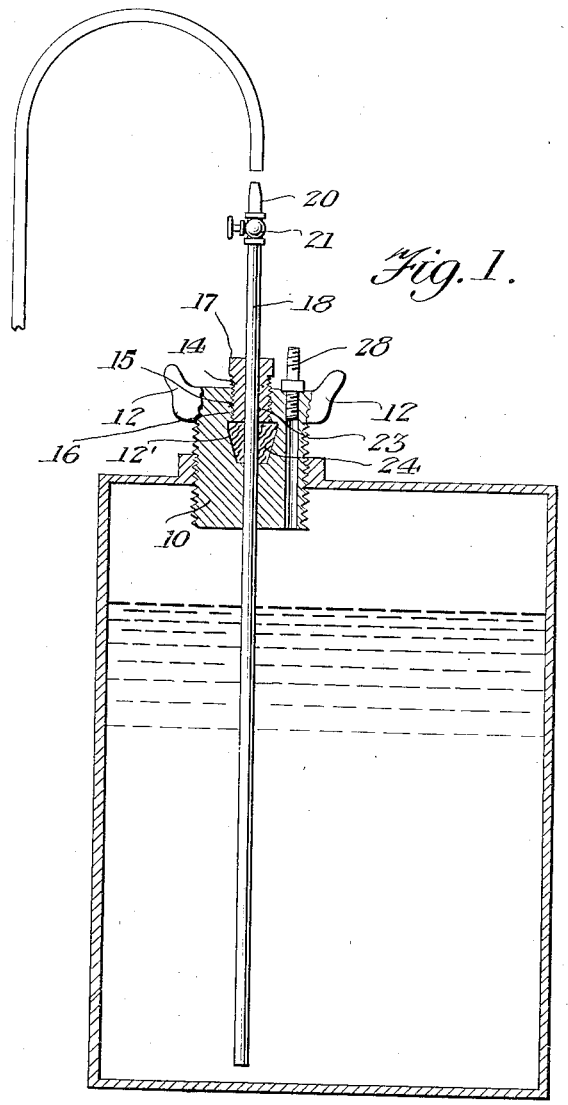
Figure 1 is a view in vertical section.
Figure 2:
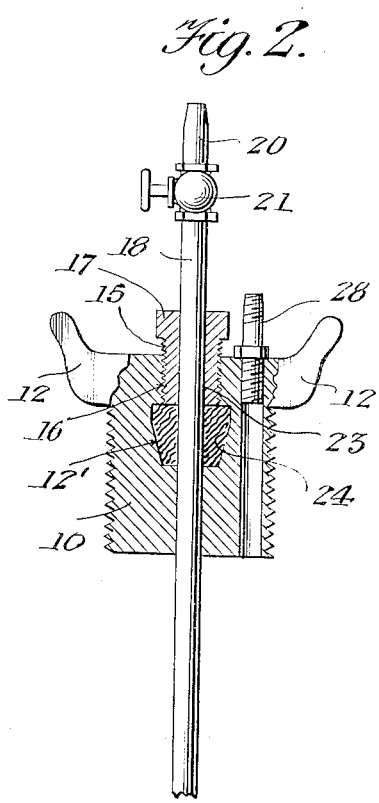
Fig. 2 is an enlarged view in vertical section through the plug, with the discharge pipe in operative position with reference thereto.
Figure 3:
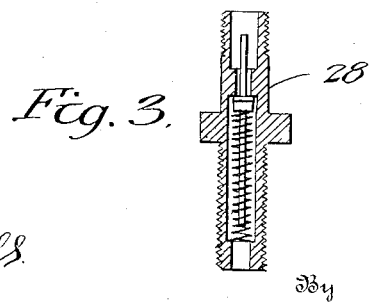
Fig. 3 is a detail in vertical section of the inlet valve and casing therefor, the latter being threaded into the plug, and shown in that position in Figs. 1 and 2.

In carrying out my invention I provide a threaded plug designated 10 and including wing members 12 permitting the introduction of the plug into the nipple of the tank or barrel by hand. The plug is provided with a recess 12' within which is located a packing material for the purpose described below. This recess has tapered walls as shown and is enlarged just below the point where the threads 16 terminate, so that the packing referred to below is positively retained in its seat.

A tubular member 14 is provided with external threads 15 coöperating with the internal threads 16 in the bore through the upper portion of the plug. This bore communicates with the recess above mentioned. The tubular member is provided with a head 17 and affords means for mounting a tube 18 constituting a discharge duct. The end of this duct is formed into a nozzle 20 which is under the control of a valve 21. The tube is slidable through the smooth bore 23 of the tubular member, and the packing material 24 within the recess mentioned not only serves to provide an air-tight and liquid-tight joint, but a reasonable degree of compression, exerted by adjusting the tubular member, produces frictional engagement with the discharge tube 18, and retains the latter in any adjusted position.

Air is introduced through the connection 28 which is threaded to receive the standard threaded connection employed in connection with air-hose for filling tires.

What is claimed is:

In a device of the class described, a member having a heavy body portion threaded externally, means permitting the manual operation of the member, said member being provided with a recess of varying cross section, a packing within the recess terminating along the line of the greatest cross section, said member having a central bore and the packing having a bore in alinement therewith, said member also having a smaller bore above the recess, a tubular member threaded into the bore last named and itself having a bore in alinement with the bore of the packing, the tubular member bearing on the packing, a discharge tube extending through the several bores, the member being provided with an additional bore parallel with that first named, a casing threaded into the additional bore, and an inlet valve operating within the casing.

In testimony whereof I affix my signature.

HARRY O. FINLEY.